United States Patent
Ju et al.

(10) Patent No.: US 10,521,861 B1
(45) Date of Patent: Dec. 31, 2019

(54) DECENTRALIZED ASSET CUSTODY AND CLEARING PLATFORM SYSTEM

(71) Applicant: Blue Helix, Grand Cayman (KY)

(72) Inventors: Jianhua Ju, Beijing (CN); Boli Wang, Beijing (CN); Fulin Tang, Beijing (CN); Yuqi Lin, Beijing (CN)

(73) Assignee: Blue Helix, Grand Cayman ( * ) Notice: Subject to any disclaimer, the term of this patent is extended or adjusted under 35 U.S.C. 154(b) by 0 days.

(21) Appl. No.: 16/523,288

(22) Filed: Jul. 26, 2019

(30) Foreign Application Priority Data

Sep. 11, 2018 (CN) .......................... 2018 1 1055383

(51) Int. Cl.
*G06Q 40/04* (2012.01)
*H04L 9/32* (2006.01)
*G06Q 20/38* (2012.01)

(52) U.S. Cl.
CPC ........... *G06Q 40/04* (2013.01); *G06Q 20/389* (2013.01); *H04L 9/3247* (2013.01); *H04L 2209/38* (2013.01)

(58) Field of Classification Search
CPC .... G06Q 40/04; G06Q 20/389; H04L 9/3247; H04L 2209/38
See application file for complete search history.

(56) References Cited

U.S. PATENT DOCUMENTS

| | | | |
|---|---|---|---|
| 9,875,510 B1 * | 1/2018 | Kasper | G06Q 40/12 |
| 10,348,488 B1 * | 7/2019 | Paczkowski | H04L 63/107 |
| 10,417,188 B2 * | 9/2019 | King | G06F 16/137 |
| 10,417,217 B2 * | 9/2019 | Pierce | G06Q 20/0658 |
| 10,419,446 B2 * | 9/2019 | Reddy | H04L 63/1458 |
| 2016/0224949 A1 * | 8/2016 | Thomas | G06Q 20/027 |
| 2016/0259937 A1 * | 9/2016 | Ford | G06F 21/554 |
| 2016/0260169 A1 * | 9/2016 | Arnold | G06Q 40/12 |
| 2017/0155515 A1 * | 6/2017 | Androulaki | G06F 21/64 |
| 2017/0232300 A1 * | 8/2017 | Tran | H04L 67/12 434/247 |
| 2017/0279818 A1 * | 9/2017 | Milazzo | H04L 63/1416 |
| 2017/0293669 A1 * | 10/2017 | Madhavan | G06Q 40/04 |
| 2017/0323392 A1 * | 11/2017 | Kasper | G06Q 40/12 |
| 2017/0344987 A1 * | 11/2017 | Davis | H04L 63/06 |
| 2018/0025435 A1 * | 1/2018 | Karame | G06Q 40/12 705/30 |
| 2018/0039667 A1 * | 2/2018 | Pierce | G06Q 20/0658 |
| 2018/0101560 A1 * | 4/2018 | Christidis | G06F 16/215 |
| 2018/0113752 A1 * | 4/2018 | Derbakova | G06Q 40/025 |

(Continued)

*Primary Examiner* — Darren B Schwartz
(74) *Attorney, Agent, or Firm* — Burke, Williams & Sorensen, LLP

(57) ABSTRACT

The present disclosure provides a method and system for decentralized digital asset storage and transfer. An exemplary system includes a platform including at least three dedicated and computationally independent computing nodes, and a first access gateway communicably coupled to the platform. The platform is configured to, upon receipt of a digital asset storage or transfer instruction via said first access gateway, perform a method including: performing, by each said node independently, a verification process in respect of said instruction to determine a verification result, and broadcasting said verification result thereof to the other nodes; determining a consensus between verification results determined by said nodes; and in the event of a consensus, each node processing said instruction, independently of said other nodes.

10 Claims, 4 Drawing Sheets

(56) References Cited

U.S. PATENT DOCUMENTS

| | | | |
|---|---|---|---|
| 2018/0189732 A1* | 7/2018 | Kozloski | G06Q 10/101 |
| 2018/0315055 A1* | 11/2018 | Pickover | G06Q 30/016 |
| 2018/0341930 A1* | 11/2018 | Moir | G06Q 20/0655 |
| 2018/0343126 A1* | 11/2018 | Fallah | H04L 9/30 |
| 2018/0349968 A1* | 12/2018 | O'Brien | H04L 67/1097 |
| 2019/0014124 A1* | 1/2019 | Reddy | H04L 63/108 |
| 2019/0236562 A1* | 8/2019 | Padmanabhan | H04L 63/00 |
| 2019/0260574 A1* | 8/2019 | Shi | H04L 9/321 |

\* cited by examiner

DECENTRALIZED ASSET CUSTODY AND CLEARING PLATFORM SYSTEM

CROSS REFERENCE TO RELATED PATENT APPLICATIONS

This disclosure claims priority to Chinese Patent Application No. CN201811055383.7, entitled "A Decentralized Asset Custody and Clearing Platform System" filed Sep. 11, 2018, herein incorporated by reference.

TECHNICAL FIELD

The present disclosure generally relates to blockchain field, and more particularly, to a method and system for decentralized digital asset storage and transfer.

BACKGROUND

Blockchain is a chained data structure that is connecting data blocks in chronological order, and it is a distributed ledger that is immutable and unforgeable guaranteed by cryptography, where the ledger records digital asset derived from cryptography. All in all, blockchain technology is a whole new distributed infrastructure and computed mode that utilizes chained-block data structure to authenticate and store data, that utilizes distributed nodes consensus algorithm to generate and update data, that utilizes cryptography to protect data transmission and access, that utilizes smart contracts which are formed by automated scripts to program and process data.

Centralized exchange is a centralized platform or application, which allows users to trade fiat currencies or one type of cryptocurrencies with other types of cryptocurrencies. Users directly deposit cryptocurrencies into exchange, which helps store capital as a wallet until orders are generated. Centralized exchanges have high trading efficiency and good user experience, but they suffer from crucial defects such as low security.

Decentralized exchange is differentiated from centralized exchange in that user assets in a decentralized exchange are not controlled by a single institution or platform. In the whole life cycle of a transaction, user assets are under the full control of the users themselves or decentralized communities or organizations. Decentralized exchanges are more robust to security attacks, but they suffer from low trading efficiency and bad user experience.

SUMMARY OF DISCLOSURE

The embodiments of the present disclosure provide decentralized digital asset storage and transfer system and method of using the same thereof.

In some embodiments, an exemplary system includes a platform including at least three dedicated and computationally independent computing nodes via one or more modules of a computing network, and a first access gateway on a computing device communicably coupled to the platform. The platform is configured to, upon receipt of a digital asset storage or transfer instruction via said first access gateway, perform a method including: performing, by each said node independently, a verification process in respect of said instruction to determine a verification result, and broadcasting said verification result thereof to the other nodes; determining a consensus between verification results determined by said nodes; and in the event of a consensus, each node processing said instruction, independently of said other nodes.

In some embodiments, an exemplary method includes: providing a first access gateway communicably coupled to a platform comprising at least three dedicated and computationally independent computing nodes via one or more modules of a computing network. The method also includes: receiving a digital asset storage or transfer instruction via said first access gateway; performing, by each said node independently, a verification process in respect of said instruction to determine a verification result, and broadcasting said verification result thereof to the other nodes; determining a consensus between verification results determined by said nodes; and in the event of a consensus, processing said instruction by each node independently of said other nodes.

In one embodiment, a system for decentralized digital asset storage and transfer system includes a platform having at least three dedicated and computationally independent computing nodes, and a first access gateway communicably coupled to the platform. The platform is configured to, upon receipt of a digital asset storage or transfer instruction via the first access gateway, perform a method of performing, by each of the node independently, a verification process via a verification module in respect of the instruction to determine a verification result, broadcasting the verification result thereof to the other nodes, determining a consensus between verification results determined by the nodes, and in the event of a consensus, each node processing the instruction, independently of the other nodes.

In one embodiment, the method further includes packing result data from the processing by each node into respective block data, and adding the block data to a local blockchain network hosted by the platform.

In another embodiment, the platform is configured to define one of the nodes as an originating node and the other nodes as verifying nodes, and where the platform is further configured to, upon receipt of a digital asset storage or transfer instruction, perform a method including: performing, by the originating node, a verification process in respect of the instruction to determine a verification result, and broadcasting the verification result to the verifying nodes; upon receipt of the verification result from the originating node, performing by each of the verifying nodes a verification process in respect of the instruction, and broadcasting the result thereof to each of the other nodes; determining a consensus between the verification results determined by the nodes; and in the event of a consensus, each node processing the instruction independently of the other nodes. In yet another embodiment, in the event that the consensus between the verification results of the nodes is not reached, the platform is configured to select an alternative one of the nodes as an originating node, and repeat the method with the other nodes as verifying nodes.

In one embodiment, the originating node is defined according to a mining validation strategy. In another embodiment, the originating node is configured to perform the verification process in respect of the instruction to obtain a first clearing result, sign the first clearing result with its private key, and broadcast the signed first clearing result to the verifying nodes.

In one embodiment, the verifying nodes are configured to, upon receipt of the signed first clearing result, perform the verification process in respect, of the instruction to obtain a local clearing result, and compare the local clearing result with the first clearing result to determine a verification result. In an embodiment, each of the verifying nodes is configured to sign the respective verification result with its own private key and broadcast the signed verification result to the other nodes. In another embodiment, each node is configured to, upon receipt of signed verification results from the other nodes, calculate, using the verification results, a final verification result. In yet another embodiment, each node is configured to perform a verification process in respect of the first clearing result in relation to a respective final verification result and, if the clearing result is verified, pack the first clearing result and verification data into block data and add the block data to a local blockchain network hosted by the platform.

In one embodiment, a consensus is determined between the verification results of processing by the nodes when the verification results of a majority of the nodes correspond. In another embodiment, asset control rights are stored in a distributed manner among the nodes, each node storing a fragment of a respective asset control right. In another embodiment, the system further includes a second access gateway configured to be coupled to an external blockchain network.

In one embodiment, the system further includes a second access gateway configured to be coupled to an external blockchain network, and when the instruction includes a digital asset transfer, the second access gateway is configured to, in the event that a consensus is determined between the verification results of the nodes, package respective asset control right fragments into a transfer instruction compatible with a specified external blockchain network, and transmit the transfer instruction to the external blockchain network.

In one embodiment, in operation a method for decentralized digital asset storage and transfer includes: providing a first access gateway via a first computing device communicably coupled to a platform having at least three dedicated and computationally independent computing nodes via one or more modules of a computing network, receiving a digital asset storage or transfer instruction via the first access gateway, performing, by each of the nodes independently, a verification process via a verification module in respect of the instruction to determine a verification result, and broadcasting the verification result thereof to the other nodes, determining a consensus between verification results determined by the nodes, and in the event of a consensus, processing the instruction by each node independently of the other nodes.

BRIEF DESCRIPTION OF THE DRAWINGS

The disclosure is more fully appreciated in connection with the following detailed description taken in conjunction with the accompanying drawings, in which.

DETAILED DESCRIPTION

Figure 1:
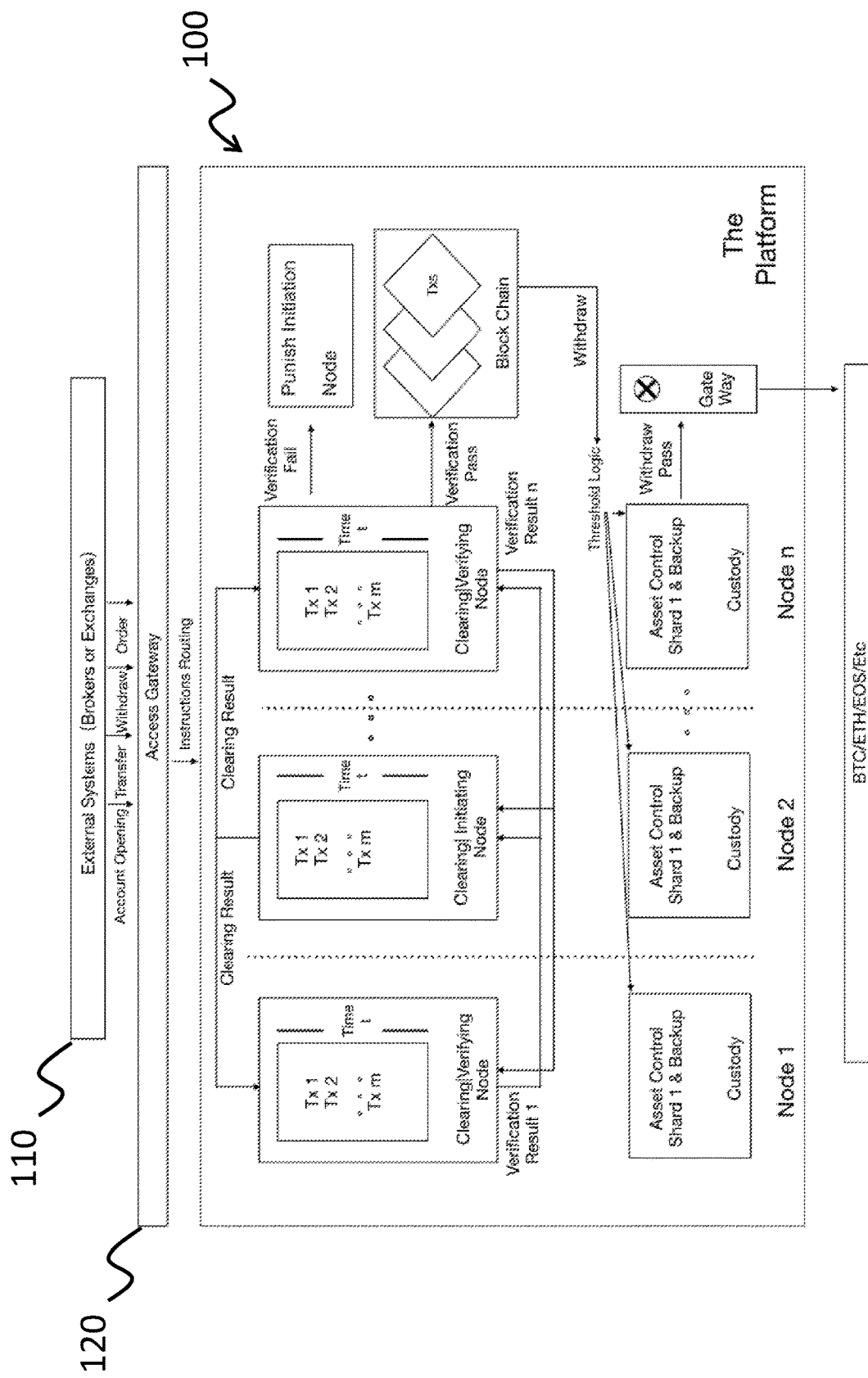
FIG. 1 is a schematic diagram of a method for constructing an efficient and secure decentralized asset custody and clearing platform system according to the present disclosure.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items. It will be appreciated by those of ordinary skill in the art that the embodiments disclosed herein can be embodied in other specific forms without departing from the spirit or essential character thereof. The presently disclosed embodiments are therefore considered in all respects to be illustrative and not restrictive.

In order to tackle the issues of low trading efficiency and bad user experience, some embodiments of this disclosure provide a construction method for a decentralized asset custody and clearing platform which maintains the trading efficiency and user experience to that of a centralized exchange, while keeping the high security and robustness-from-attack features of a decentralized exchange. Following is the technology solutions of this disclosure.

As can be appreciated, the efficient and secure decentralized asset custody and clearing platform system can be carried out using computing devices having one or more processors and one or more computer-readable storage media having stored therein computer-executable instructions for causing the one or more processors, when programmed thereby, to perform the operations and steps disclosed herein. The plurality of computing devices can be provided within a computing network.

In one embodiment, an efficient and secure decentralized asset custody and clearing platform system is characterized by: replacing centralized (single center) asset custody and clearing platform with a platform of N (N>=3) nodes. In operation, the platform receives trading and custody instructions through an access gateway. Each of the N nodes is able to operate transactions clearing and assets custody independently. The result of each node's clearing and custody operations is broadcast to other nodes. After the N nodes reach consensus on the results, they complete the decentralized asset clearing and custody instructions together.

In one embodiment, the platform can be carried out on a computing network and each node can be disposed on a computing device in communication with the computing network. It will also be understood that a computing device may have corresponding modules for carrying out the various processing tasks described herein, e.g., performing verification process, broadcast verification results, determining consensus, among other tasks.

When the decentralized asset custody and clearing platform performs transaction clearing, the N nodes collectively perform clearing on the transaction, which includes the following steps:

Step 1: According to a certain strategy, the originating node of the transaction clearing is selected from the N nodes, and the other N−1 nodes are the verifying nodes of the transaction clearing. The selection strategy of the originating node includes but is not limited to the following: POW (proof of work), POS (proof of stake), DPOS (delegated proof of work), and simple polling alternation.

Step 2: The originating node performs clearing of M (M>=1) transaction instructions in unit time t, and obtains a clearing result R. R can be expressed formally as: R=$\varphi$(t, M), where $\varphi$ denotes the agreed clearing method. The originating node signs the clearing result R using the private key "si" representing its own identity, obtains the $R_{si}$, and then broadcasts it to the other N−1 verifying nodes.

Step 3: After receiving the clearing result $R_{si}$ broadcasted by the initiating node, any verification node performs the clearing of the M transaction instructions again to obtain the local clearing result "r." The verification node compares "r" with R to obtain the verification result "f" of this time. "f" can be expressed formally as: f=$\lambda$(r, R), where $\lambda$ represents the agreed verification method. The verification node signs the verification result "f" with the private key "sv" representing its own identity, obtains $f_{sv}$, and then broadcasts it to all other nodes.

Step 4: Any node obtains the verification result "f" of all other N−1 nodes regarding the clearing result R. Based on N nodes of "f," all nodes locally calculate the final verification result F. F can be expressed as: F=$\psi$(f1, f2 . . . fn), where $\psi$ denotes the agreed final verification method, which is generally calculated by the method of majority results.

Step 5: Any node performs corresponding processing on the clearing result $R_{si}$ according to F: if F is passed, then {$R_{si}$,t,m} is packed into block data, and the data is added to the local chain by adding a block. The chain structure finally forms a transaction clearing blockchain through repeated data addition; if F is not passed, replace the initiating node according to the strategy described in step 1, and re-execute steps 1-5 to clear the "m" trading instructions.

In one embodiment, when the decentralized asset custody and clearing platform performs asset custody, the N nodes collectively manage the custody assets, and includes the following steps:

Step 1: Fragment the asset control right P and distribute the asset control rights fragments in the N nodes. P can be formally described as: P=$\omega$ (p1, p2 . . . pn), $\omega$ represents fragmentation processing method, in the multi-signature scheme, p represents a private key of n private keys; in a single signature scheme, p represents certain 1/n private key fragment.

Step 2: In order to prevent the control rights of the assets being completely lost when a few nodes in N nodes fail, each node performs redundant storage of asset control rights fragments according to the control strategy. The redundant storage scheme needs to satisfy the majority of nodes so as to recover the control right of the assets, while a few nodes cannot recover the control right.

Step 3: The asset control right fragment of each node is protected by the threshold logic to ensure that only after the withdrawal instruction passes the above-mentioned clearing process and is written in the blockchain, can it then be accessed by the node.

Step 4: When a majority of the N nodes agree on the withdrawal instruction, the blockchain gateway packages the multiple asset control rights fragments into an acceptable transfer instruction of the blockchain in which the custody asset is located, and broadcasts to the blockchain network.

In operation, the decentralized asset custody and clearing platform is able to interact with external systems through an access gateway. External systems, such as brokers or exchanges, issue account openings, transfers, withdrawals, and trading orders to the decentralized asset custody and clearing platform through the access gateway. For example, when the platform receives an account opening and withdrawal request, it adopts a multi-factor authentication method. After confirming the user request again, the corresponding operation can be completed. If the user performs an asset withdrawal operation, after the clearing and threshold logic of the decentralized asset custody platform is sequentially performed, the request is sent to the corresponding blockchain network to complete the final withdrawal operation according to the type of the asset extraction requested by the user.

In some embodiments, the multi-factor authentication can be at least one of short messaging, e-mail notification, and GA authentication, or combinations thereof, among others.

The beneficial effects of this disclosure include, among others: 1) Constructing an asset custody and clearing platform without relying on any single institution or entity, by decentralized and multi-node organizational forms. User assets security is determined by majority nodes combined instead of any single or a few nodes on the platform thereby mitigating the security issues with centralized exchanges; 2) The decentralized exchanges and virtual brokers constructed on such platform could provide users with similar performance and user experience as that of centralized exchanges, while maintaining independent operations and sharing market depth and liquidity; 3) The operations by virtual brokers, exchanges, decentralized asset custody and clearing platforms are all trackable, queriable and immutable. This prevents the incentive for parties to inflate fake assets from underlying mechanism and tracks liabilities in case of disputes.

In one embodiment, a schematic diagram of the overall architecture of an efficient and secure decentralized asset custody and clearing platform 100 is shown in FIG. 1. The account opening, transfer, withdrawal and ordering instructions of the external system 110 are routed to the decentralized asset custody and clearing platform system 100 via the access gateway muting 120. As shown in the figure, in this example, node 2 is the transaction clearing initiation node, and the remaining nodes are transaction clearing verification nodes. In one embodiment, the nodes may include verification modules for carrying out the verification processes.

In operation, node 2 clears the transaction record 1-M in time t, and broadcasts the clearing result to other N−1 nodes for verification. After receiving the clearing result of the originating node, the verification node re-clears the transaction record 1-M, compares the clearing result with the received clearing result, obtains the verification result, and broadcasts the verification result to other N−1 nodes. In one embodiment, if N/2 or more nodes think that the clearing result is correct, then the clearing result is verified, and the transaction 1-M will be packaged into blocks, and added to the unchangeable block record in an additional manner to become a part of the blockchain. In another embodiment, if N/2 or more nodes think that the clearing result is wrong, then the clearing result is not verified, and node 3 will replace node 2 as the initiating node, re-clear the transaction 1-M, and follow the preset penalty policy to penalize node 2. If the withdrawal instruction is received at this time, the withdrawal request is sent to the threshold logic on the basis of the clearing result. The threshold logic distributes the request to each node, and each node votes for the withdrawal request through its own asset control right fragment. If more than N/2 nodes agree to the withdrawal, the withdrawal request is passed. If N/2 or more nodes disagree with the withdrawal, the withdrawal request is rejected.

Figure 2:
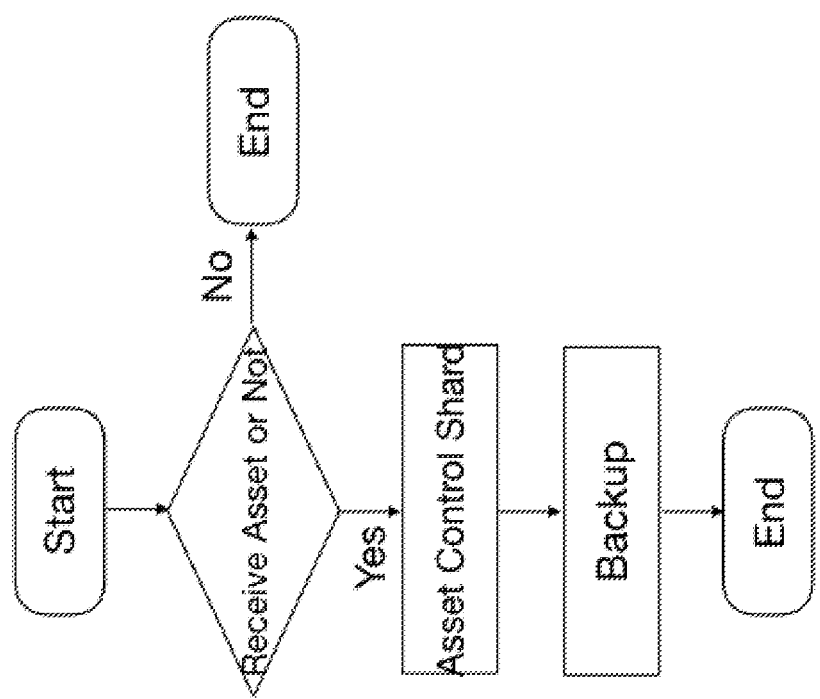
FIG. 2 is a flow diagram of the asset custody service according to the present disclosure.

In one embodiment, the process of asset custody service is shown in FIG. 2. After the process starts, the decentralized asset custody and clearing platform first judges whether the custody asset is correctly received. If it is not received, then the process ends abnormally. After receiving the asset, the asset control right is first fragmented. Then, control right fragment is redundantly backed up according to the security policy.

Figure 3:
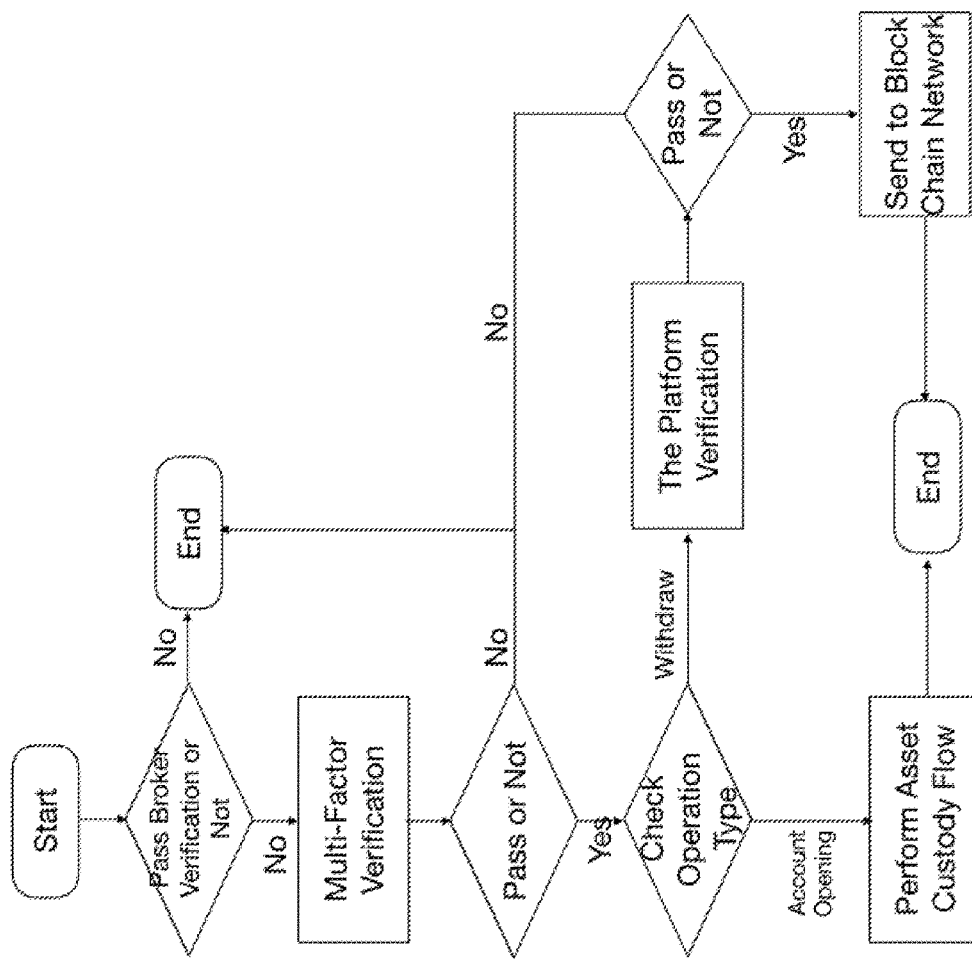
FIG. 3 is a flow diagram of an external system account opening and asset withdrawal according to the present disclosure.

In one embodiment, the external system's account opening and asset withdrawal process is shown in FIG. 3. The external system is based on brokers and exchanges. After the process starts, the broker first verifies the identity of the user, and if the verification fails, the process ends abnormally. After the verification passes, the decentralized asset custody and clearing platform performs multi-factor verification. If the verification fails, the process ends abnormally. After the verification is passed, different processes are executed according to the operation type: if it is an asset withdrawal operation, the decentralized asset custody and clearing platform performs multi-node verification. If the verification passes, the asset withdrawal request is sent to the corresponding blockchain network to complete the asset withdrawal operation. If the account opening operation is performed, the asset custody service flow is executed. After the process ends, the account opening operation ends normally.

Figure 4:
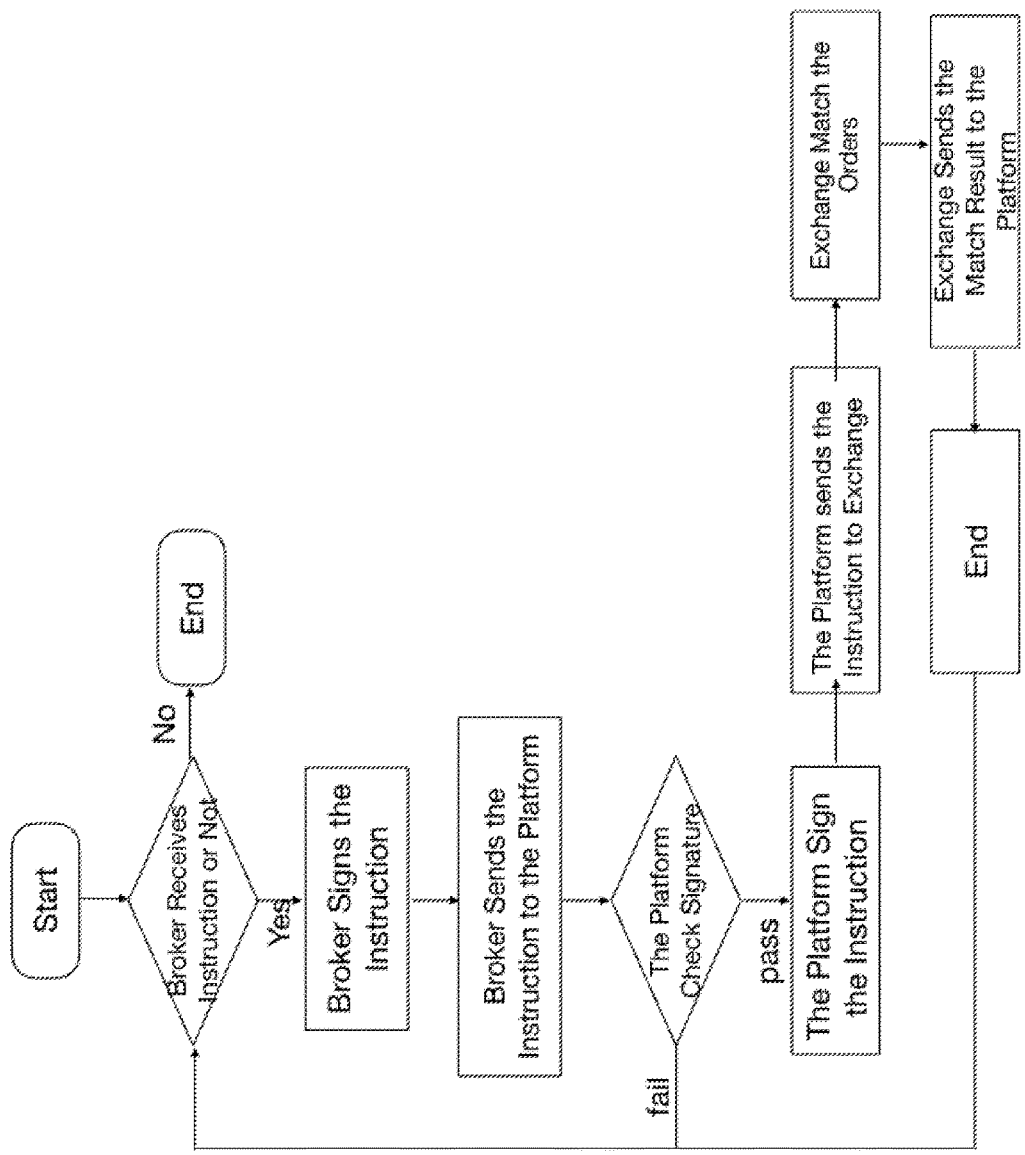
FIG. 4 is a flow diagram of an external system transaction order according to the present disclosure.

In one embodiment, the transaction order flow of the external system is shown in FIG. 4. The external system is based on brokers and exchanges. After the process starts, the broker first judges whether the transaction instruction is received, and if there is no instruction, the process ends. In an embodiment, after receiving the transaction instruction, the broker first signs the transaction instruction with his private key, and then sends the signed instruction to the decentralized asset custody and clearing platform. In another embodiment, after receiving the transaction instruction, the platform first detects whether the instruction includes the broker's signature, and if it does not, the platform ignores the instruction. Alternatively, if it does, the platform uses its own private key to sign the transaction, and then sends the transaction to the exchange. In one embodiment, after the exchange completes the transaction order, the exchange sends the result to the decentralized asset custody and clearing platform, which completes the clearing of the transaction accordingly. In another embodiment, the transaction order flow proceeds to the next transaction instruction in the same process until no new instructions are received.

The foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications; they thereby enable others skilled in the art to best utilize the disclosure and various embodiments with various modifications as are suited to the particular use contemplated. Notably, not every benefit described herein need be realized by each embodiment of the disclosure; rather any specific embodiment can provide one or more of the advantages discussed above. It is intended that the following claims and their equivalents define the scope of the disclosure.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to" shall mean sufficiently close to have a material effect upon the respective system element interactions.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for decentralized digital asset storage and transfer system, the system comprising:
   a platform comprising at least three dedicated and computationally independent computing nodes via one or more modules of a computing network;
   a first access gateway on a computing device communicably coupled to said platform, wherein said platform is configured to, upon receipt of a digital asset storage or transfer instruction via said first access gateway, perform a method comprising:
   defining, one of said computing nodes as an originating node, and other of said computing nodes as verifying nodes;
   performing, by said originating node independent of said verifying nodes, a verification process with respect to said instruction to obtain a clearing result, and broadcasting said clearing result thereof to said verifying nodes;
   performing, by each of said verifying nodes, upon receipt of said clearing result from said originating node, additional verification processes with respect to said instruction to obtain a local clearing result for each of said verifying nodes, and comparing said clearing result with each of said local clearing result of each of said verifying nodes to obtain a verification result for each of said verifying nodes;

determining a consensus among said verification results determined by each of said verifying nodes, said consensus is reached when a majority of said verifying nodes correspond on said verification results;

in the event said consensus is reached, each of said computing nodes processing said instruction independent of said other computing nodes;

packing result data from said processing by each of said computing nodes into respective block data, and adding said block data to a local blockchain network hosted by said platform;

storing digital asset control rights to said instruction among said computing nodes in a distributed manner, each of said computing nodes storing a fragment or fragments of a respective asset control right; and a second access gateway configured to be coupled to an external blockchain network;

wherein when said instruction comprises a digital asset transfer, said second access gateway is configured to, in the event that a threshold logic is reached by said consensus and said block data are added to said local blockchain network, packaging respective asset control right fragments from said computing nodes into a transfer instruction compatible with said external blockchain network, and transmit said transfer instruction to said external blockchain network.

2. The system according to claim 1, wherein said originating node is defined according to a mining validation strategy.

3. The system according to claim 1, wherein said originating node is configured to perform said verification process via a verification module and sign said clearing result with said originating node private key.

4. The system according to claim 3, wherein each of said verifying nodes is configured to sign said respective verification result with its own private key and broadcast said signed verification result to said other verifying nodes.

5. The system according to claim 3, wherein each of said verifying nodes is configured to, upon receipt of signed verification results from said other verifying nodes, calculating using said verification results, a final verification result.

6. A method for decentralized digital asset storage and transfer, the method comprising:

providing a first access gateway via a first computing device communicably coupled to a platform comprising at least three dedicated and computationally independent computing nodes via one or more modules of a computing network, wherein one of said computing nodes is an originating node and the other of said computing nodes are verifying nodes, the method comprising:

receiving a digital asset storage or transfer instruction via said first access gateway;

performing, by said originating node independent of said verifying nodes, a verification process with respect to said instruction to obtain a clearing result, and broadcasting said clearing result thereof to said verifying nodes;

performing, by each of said verifying nodes, upon receipt of said clearing result from said originating node, additional verification processes with respect to said instruction to obtain a local clearing result for each of said verifying nodes, and comparing said clearing result with each of said local clearing result of each of said verifying nodes to obtain a verification result for each of said verifying nodes;

determining a consensus among said verification results determined by each of said verifying nodes, said consensus is reached when a majority of said verifying nodes correspond on said verification results;

in the event of said consensus is reached, each of said computing nodes processing said instruction independent of said other computing nodes;

packing result data from said processing by each of said computing nodes into respective block data, and adding said block data to a local blockchain network hosted by said platform;

storing digital asset control rights to said instruction among said computing nodes in a distributed manner, each of said computing nodes storing a fragment or fragments of a respective asset control right; and providing a second access gateway configured to be coupled to an external blockchain network;

wherein when said instruction comprises a digital asset transfer, said second access gateway is configured to, in the event that a threshold logic is reached by said consensus and said block data are added to said local blockchain network, packaging respective asset control right fragments from said computing nodes into a transfer instruction compatible with said external blockchain network, and transmit said transfer instruction to said external blockchain network.

7. The method according to claim 6, wherein said originating node is defined according to a mining validation strategy.

8. The method according to claim 6, wherein said originating node is configured to perform said verification process via a verification module and sign said clearing result with said originating node private key.

9. The method according to claim 8, wherein each of said verifying nodes is configured to sign said respective verification result with its own private key and broadcast said signed verification result to said other verifying nodes.

10. The method according to claim 8, wherein each of said verifying nodes is configured to, upon receipt of signed verification results from said other verifying nodes, calculating, using said verification results, a final verification result.

* * * * *